H. SCHREIBER.
KNEADING AND MIXING MACHINE.
APPLICATION FILED MAR. 4, 1910.

979,804.

Patented Dec. 27, 1910.

Witnesses
C. N. Walker.
L. E. Fischer.

Inventor
Hans Schreiber
by S. Brashears, Atty

THE NORRIS PETERS CO., WASHINGTON, D. C.

UNITED STATES PATENT OFFICE.

HANS SCHREIBER, OF BERLIN, GERMANY.

KNEADING AND MIXING MACHINE.

979,804.  Specification of Letters Patent.  Patented Dec. 27, 1910.

Application filed March 4, 1910. Serial No. 547,313.

*To all whom it may concern:*

Be it known that I, HANS SCHREIBER, a subject of the German Emperor, and residing at Berlin, German Empire, have invented certain new and useful Improvements in Kneading and Mixing Machines, of which the following is a specification.

My invention relates to improvements in kneading and mixing machines provided with two crank actuated agitators.

In prior machines of this class the cranks are arranged symmetrically to each other, so that the agitating arms always move simultaneously in opposite directions, that is to say, their advance is always simultaneous and likewise their retreat. The action of the agitators on the material being treated is thus always the same, the mass being rent both on the approach and retreat of the two agitators.

Certain materials, such as ordinary bakers' dough, however, will not bear such treatment, whereas others, as for example the dough used in the making of certain descriptions of gingerbread cakes, demand breaking up of the mass which has hardened through long standing, prior to the actual kneading operation.

The object of my invention is to provide a machine which can be employed for treating different classes of material in the particular manner required by each. For this purpose I so mount the one crank that it can be shifted with respect to the other one, whereby the relative position and motion of the arms can be altered.

One constructional form of the new machine is illustrated in the accompanying drawing, in which—

Figure 1:
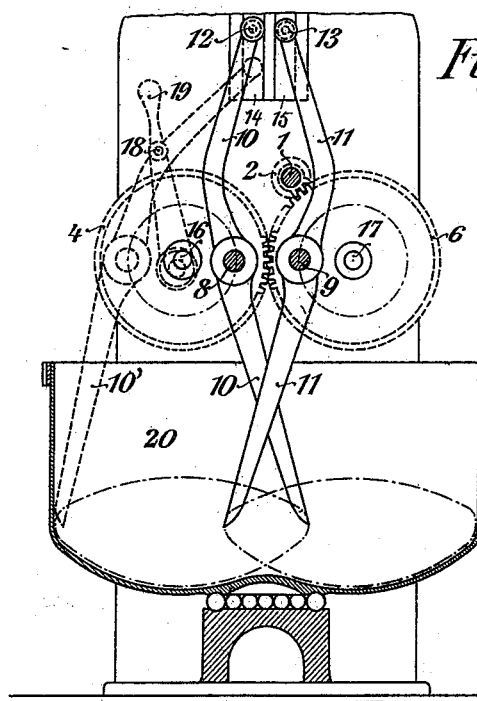
Figure 2:
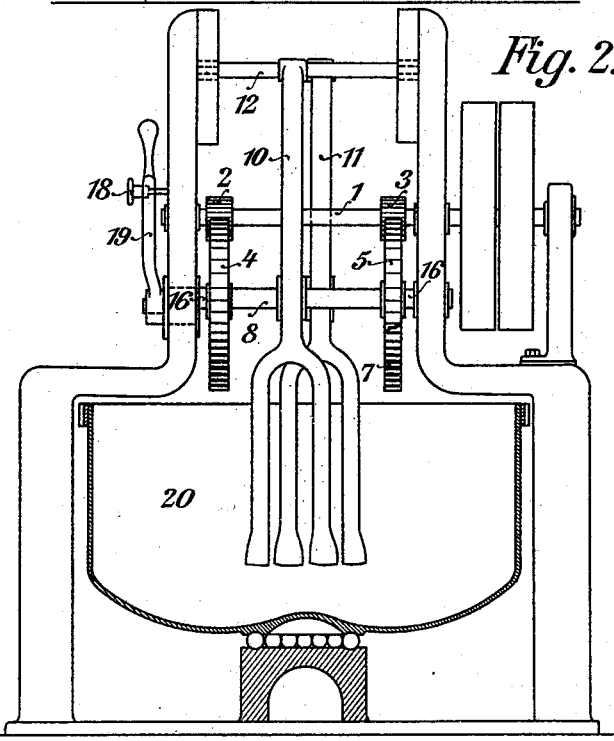

Figure 1 is a vertical section, and Fig. 2 an elevation part in section of the machine.

On the driving shaft 1 of the machine there are mounted pinions 2, 3 meshing with gears 6, 7, which latter engage with other gears 4, 5. The pairs of gears 4, 5 and 6, 7 are each provided with a crank pin 8, 9, on which are loosely mounted the agitating arms 10, 11, which dip into the rotative trough 20. The top ends of the agitators 10, 11 are secured to rods 12, 13, which reciprocate in vertical guideways 14, 15 on the machine frame.

The shaft 17 of the gears 6, 7 is mounted in stationary bearings, while the position of the shaft 16 of the gears 4, 5 can be altered by means of an eccentric lever 19, which can be adjusted with the aid of a set screw 18. In this manner the gears 4, 5 can be disengaged from the gears 6, 7 and set in any desired position, so that for instance the agitator 10 occupies the dotted line position 10' (Fig. 1), while the other agitator 11 maintains its position as shown. In such relative position of the agitators the dough will be kneaded in an essentially different manner than when the agitators are symmetrically mounted, and in particular it will not be rent asunder.

Having thus described my invention, I declare that what I claim as new and desire to secure by Letters Patent is—

1. In a kneading and mixing machine, in combination, two shafts, a toothed wheel each of the same, an agitating arm journaled to each crank, means for driving said shafts, and means for shifting the position of the one crank shaft relatively to the other one, whereby the relative position of the agitating arms can be altered, substantially as described.

2. In a kneading and mixing machine, in combination, two shafts, a toothed wheel mounted on each of the same, an agitating arm journaled eccentrically to each wheel, means for driving the one shaft, and means for bringing the one wheel into or out of engagement with the other one, substantially as described.

3. In a kneading and mixing machine, in combination, two shafts, a pair of toothed wheels mounted on each of the same, a crank pin connecting the wheels of each pair, an agitating arm journaled on each pin, means for driving the one shaft, and means for bringing the one pair of wheels into or out of engagement with the other pair, substantially as described.

In testimony whereof I affix my signature in presence of two witnesses.

HANS SCHREIBER.

Witnesses:
 HENRY HASPER,
 WOLDEMAR HAUPT.